(12) United States Patent
Darbel et al.

(10) Patent No.: US 7,369,577 B2
(45) Date of Patent: May 6, 2008

(54) CODE GROUP ACQUISITION PROCEDURE FOR A UMTS-FDD RECEIVER

(75) Inventors: Nicolas Darbel, San Diego, CA (US); Fabrice Belvèze, Fontanil-Cornillon (FR); Grégory Faux, Gonesse (FR)

(73) Assignee: STMicroelectronics, Inc., Carrollton, TX (US)

( * ) Notice: Subject to any disclaimer, the term of this patent is extended or adjusted under 35 U.S.C. 154(b) by 1118 days.

(21) Appl. No.: 10/151,485

(22) Filed: May 16, 2002

(65) Prior Publication Data
US 2003/0220755 A1    Nov. 27, 2003

(51) Int. Cl.
H04J 3/06    (2006.01)
(52) U.S. Cl. .................. 370/503; 375/142
(58) Field of Classification Search ......... 370/319–349
See application file for complete search history.

(56) References Cited

U.S. PATENT DOCUMENTS

| | | | | |
|---|---|---|---|---|
| 5,930,366 | A | 7/1999 | Jamal et al. | 380/48 |
| 6,801,567 | B1* | 10/2004 | Schmidl et al. | 375/149 |
| 6,831,956 | B1* | 12/2004 | Schmidl et al. | 375/343 |
| 6,888,880 | B2* | 5/2005 | Lee et al. | 375/149 |
| 6,996,162 | B1* | 2/2006 | Hosur et al. | 375/150 |
| 7,023,831 | B2* | 4/2006 | Okuyama | 370/342 |
| 2002/0150188 | A1* | 10/2002 | Rudolf | 375/354 |
| 2003/0063656 | A1* | 4/2003 | Rao et al. | 375/142 |
| 2003/0202564 | A1* | 10/2003 | Ho et al. | 375/147 |
| 2003/0223384 | A1* | 12/2003 | Sengupta et al. | 370/320 |
| 2004/0085920 | A1* | 5/2004 | Sezgin et al. | 370/320 |

OTHER PUBLICATIONS

European Search Report, 03253066.9, Jul. 31, 2003.
Gyongsu, et al., "A searcher design for the Synchronization Channel of WCDMA", *IEEE VTC 2000*, vol. 2, pp. 1364-1370, dated Sep. 24, 2000, XP010524718.
Wang, et al., "Cell Search in W-CDMA", *IEEE Inc.*,vol. 18, No. 8, pp. 1470-1482, Aug. 2000, XP002224578.
"Universal Mobile Telecommunications System (UMTS); Spreading and Modulation (FDD)(3G TS 25.213 version 3.2.0 Release 1999)", *ETSI TS 125 213 v3.2.1 (2000-3)* pp. 1-27, dated Mar. 2002, XP002203809.

* cited by examiner

*Primary Examiner*—Chi Pham
*Assistant Examiner*—Phuc Tran
(74) *Attorney, Agent, or Firm*—Lisa K. Jorgenson; Andre M. Szuwalski (57) ABSTRACT

Step 2 demodulation is conventionally performed using a secondary synchronization channel that correlates a received signal at a known time slot location against each of a plurality of sequences associated with the secondary synchronization code. The disclosed implementation proposes the use of a different synchronization channel to complete the step 2 process. More specifically, a complete synchronization channel correlator is used for the demodulation where the received signal at the known time slot location is correlated against a combination of the primary synchronization code and each of the plurality of secondary synchronization codes. This combined correlation produces enhanced step 2 performance in terms of acquisition time or signal-to-noise ratio.

30 Claims, 2 Drawing Sheets

CODE GROUP ACQUISITION PROCEDURE FOR A UMTS-FDD RECEIVER

BACKGROUND OF THE INVENTION

1. Technical Field of the Invention

The present invention relates to wideband code division multiple access (WCDMA) receivers and, in particular, to the initial acquisition of synchronization code group and frame alignment data by a UMTS-FDD receiver.

2. Description of Related Art

The cell search procedure for wideband CDMA receivers in general, and UMTS-FDD receivers in particular, to acquire the scrambling code group and frame synchronization of a cell is typically carried out in three steps: slot synchronization (step 1); frame synchronization and code-group identification (step 2); and scrambling code identification (step 3). In slot synchronization (step 1), the receiver uses the primary synchronization code (PSC) of the primary synchronization channel (P-SCH) to acquire slot synchronization to a given cell. This is typically accomplished with a single matched filter (or any similar device) matched to the primary synchronization code (which is common to all cells). The slot timing of the cell can then be obtained by detecting peaks in the matched filter output. Next, this slot timing is fed to the frame synchronization and code-group identification (step 2) process, the receiver uses the secondary synchronization codes (SSC) of the secondary synchronization channel (S-SCH) to find frame synchronization and identify the code group of the cell found in step 1. This is typically accomplished by correlating, over several slots, the received signal with all possible secondary synchronization code sequences and then identifying the maximum correlation value. Since the cyclic shifts of the sequences are unique, not only the code group, but also the frame synchronization, is determined by this correlation. Finally, scrambling-code identification (step 3) is achieved by determining the exact primary scrambling code used by the found cell. This primary scrambling code is typically identified through symbol-by-symbol correlation over the common pilot channel (CPICH) with all codes within the code group identified in the second step. After the primary scrambling code has been identified, the primary common control physical channel (CCPCH) can be detected, and the system- and cell-specific broadcast control channel (BCH) information can be read.

The primary synchronization code $C_{psc}$ is constructed as a so-called generalized hierarchical Golay sequence chosen to have good aperiodic auto correlation properties:

$$PSC = (1+j) \cdot \langle a, a, a, -a, -a, a, -a, -a, a, a, a, -a, a, -a, a, a \rangle$$

wherein: $a = \langle a_0, a_1, \ldots, a_{15} \rangle$, and more specifically:

$$a = \langle 1,1,1,1,1,1,-1,-1,1,1,-1,1,-1,1,-1,1,1 \rangle$$

in the case of UMTS-FDD. The PSC is defined for the first 256 chips of 2560-chip long slot, and takes 0 values for the 2304 remaining chips of the slot. Thus, the PSC may be rewritten as:

$$PSC = (1+j) \cdot \langle A_0 a, A_1 a, \ldots, A_{14} a, A_{15} a \rangle$$

wherein: $a = \langle a_0, a_1, \ldots, a_{15} \rangle$, and more specifically:

$$a = \langle 1,1,1,1,1,1,-1,-1,1,1,-1,1,-1,1,-1,1,1 \rangle, \text{ and}$$

$$A = \langle 1,1,1,-1,-1,1,-1,-1,1,1,1,-1,1,-1,1,1 \rangle$$

in the case of UMTS-FDD.

With respect to the plurality of secondary synchronization codes (SSC), a first 256-chip long code z is defined as:

$$z = \langle b,b,b,-b,b,b,-b,-b,b,-b,b,b,-b,-b,-b,-b \rangle$$

wherein: $b[0\text{-}7] = a[0\text{-}7]$, i.e., the first eight chips of sequence b are the same as the first eight chips of sequence a; and $b[8\text{-}15] = -a[8\text{-}15]$, i.e., the last eight chips of sequence b are the opposite of the last eight chips of sequence a.

The code z may be reformatted with respect to a code sequence B and more specifically is:

$$z = \langle B_0 b, B_1 b, \ldots, B_{14} b, B_{15} b \rangle$$

wherein: $b = \langle b_0 b_1, \ldots, b_{15} \rangle$, and more specifically:

$$b = \langle 1,1,1,1,1,1,-1,-1,1,1,-1,1,-1,1,1,-1 \rangle, \text{ and}$$

$$B = \langle 1,1,1,-1,1,1,-1,-1,1,1,-1,-1,-1,-1,-1 \rangle$$

in the case of UMTS-FDD.

The sixteen secondary synchronization code sequences $C_{ssc}$ are then constructed from a position wise multiplication of a Hadamard sequence and the code sequence z. The Hadamard sequences are obtained as the rows m in a matrix $H_8$ constructed recursively by:

$$H_0 = 1 \quad (1)$$

$$H_v = \begin{pmatrix} H_{v-1} & H_{v-1} \\ H_{v-1} & -H_{v-1} \end{pmatrix} v \geq 1$$

The rows m=16k of the matrix $H_8$ possess the property that their elements are equal within a group of sixteen consecutive values, where the first group starts with the first element of a row. In other words, the i-th element of row m takes on a value $h_{m,1}$ such that:

$$h_{m,1} = h_{m,16n} \quad (2)$$

where n is the integer division of i by sixteen:

$$i = 16n + r, \; 0 \leq r \leq 15 \quad (3)$$

For the sake of simplicity, denote $h'_{k,n}$ such that:

$$h_{m,1} = h_{m,16n} = h_{16k,16n} = h'_{k,n} \quad (4)$$

with n specified as set forth above in Equation (3), and n corresponding to the index of a group of sixteen consecutive chips within the 256-chip long sequence. Thus, the k-th secondary synchronization code sequence is:

$$SSC_k = (1+j) \cdot \langle h'_{k,0} b, h'_{k,1} b, h'_{k,2} b, -h'_{k,3} b, h'_{k,4} b, h'_{k,5} b, -h'_{k,6} b,$$
$$-h'_{k,7} b, -h'_{k,8} b, -h'_{k,9} b, h'_{k,10} b, -h'_{k,11} b, -h'_{k,12} b, -h'_{k,13} b,$$
$$-h'_{k,14} b, -h'_{k,15} b \rangle$$

which can be reformatted as:

$$SSC_k = (1+j) \cdot \langle h'_{k,0} B_0 b, h'_{k,1} B_1 b, \ldots, h'_{k,14} B_{14} b, h'_{k,15} B_{15} b \rangle.$$

The frame synchronization and code-group identification (step 2) process for UMTS-FDD (WCDMA) cell search amounts to determining which of the k secondary synchronization code $SSC_k$ sequences is transmitted every slot (where it is assumed from completion of step 1 that the slot beginning time $t_0$ is already known). This is equivalent to finding the row k of the Hadamard matrix $H_8$ that is used for the given time slot. In accordance with well known prior art techniques, the row k is typically identified by correlating the complex-valued input signal s(t) by every possible secondary synchronization code $SSC_k$ to obtain sixteen estimates as follows:

$$\overline{SSC}_k = \sum_{n=0}^{15} \left( h'_{k,n} B_n \cdot \left( \sum_{p=0}^{15} b_p s(t_0 + 16n + p) \right) \right) \quad (5)$$

to generate secondary synchronization energies. In the foregoing Equation (5), the signal s(t) is correlated over 256 samples, and the correlation by all sixteen possible $h_k$ rows is known as a reverse Hadamard transform. The energy of each of the sixteen correlations is then calculated by the searcher and used in the step 2 frame synchronization and code-group identification processing in a manner well known to those skilled in the art.

In a prior art implementation, the inner sum of the correlation defined by Equation (5) above is accomplished using a dedicated hardware device and the outer sum is taken care of by a complementary software process. That inner sum comprises N=16 separate inner sum (IS) calculations as follows:

$$IS_n = \sum_{p=0}^{15} b_p s(t_0 + 16n + p) \quad (6)$$

wherein: $0 \leq n < N = 16$, with the sixteen consecutive inner sums being used to perform the reverse Hadamard transform, and each and every one of them being used in any secondary synchronization code $SSC_k$ processing to produce correlations as follows:

$$\overline{SSC}_k = \sum_{n=0}^{15} (h'_{k,n} B_n \cdot IS_n) \quad (7)$$

The entire step 2 process may last over many slots, and in fact may take more than a frame to complete.

Notwithstanding the use of combined dedicated hardware device and software process for performing the step 2 frame synchronization and code-group identification process, it would be advantageous if the number of slots are required for step 2 completion were reduced thus producing enhanced receiver performance. The present invention addresses the foregoing need with a method and associated apparatus that outperforms conventional step 2 processes and allows for code group and frame alignment acquisition to occur at Eb/No levels lower (i.e., under more adverse conditions) than possible with prior art solutions.

SUMMARY OF THE INVENTION

Code group acquisition is accomplished by the present invention by correlating an input signal at a known time slot location against a synchronization code to acquire code group and frame synchronization information. The synchronization code used for this correlation is a combination of the primary synchronization code (PSC) and the secondary synchronization code (SSC). Use of such a combined code for step 2 demodulation of the input signal, instead of just the secondary synchronization code alone, provides for improved performance.

In accordance with one embodiment of the invention, a complete synchronization channel correlator is used for step 2 demodulation of an input signal to recover code group and frame alignment data. The complete synchronization channel correlator receives the input signal at a known time slot location. The input signal is then correlated against a synchronization code for the complete synchronization channel correlator to acquire code group and frame synchronization data. The synchronization code used by the correlator is a combination of the primary synchronization code (PSC) and the secondary synchronization code (SSC).

The complete synchronization channel correlator may be implemented within a synchronization device of a receiver. The demodulator may include a primary synchronization channel correlator that is used to correlate the input signal against the primary synchronization code to recover slot timing information and thus identify the known time slot location.

The synchronization device may be implemented within an integrated circuit chip.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

The primary synchronization code and one secondary synchronization code are transmitted at the same time during the first 256 chips of each slot. It is common, and in fact required by the UMTS-FDD standard, for the synchronization codes to be broadcast with equal power. If the broadcast power is the same, the resulting complete k-th synchronization code ($SC_k$) (i.e., the code for a complete synchronization channel (SCH) correlator as opposed to separate codes for primary and secondary synchronization channel correlators) is thus:

$SC_k = (1+j) \cdot <A_0 a + h'_{k,0} B_0 b, A_1 a + h'_{k,1} B_1 b, \ldots, A_{14} a + h'_{k,14} B_{14} b, A_{15} a + h'_{k,15} B_{15} b>$ where $A_n$, $h'_{k,n}$ and $B_n$ can take on only values of +1 or -1. Given the relationship:

$b[0-7] = a[0-7]$ and $b[8-15] = -a[8-15]$ as defined above, and considering the equal broadcast power between the primary and secondary synchronization codes, a group of sixteen consecutive chips for the secondary synchronization code $SSC_k$ can take on only one of the following four 16-chip long sequences at a time:

$$a+b = <2a_0, 2a_1, \ldots, 2a_7, 0, 0, \ldots, 0> \quad (8a)$$

$$a-b = <0, 0, \ldots, 0, 2a_8, 2a_9, \ldots, 2a_{15}> \quad (8b)$$

$$-a+b = -<0, 0, \ldots, 0, 2a_8, 2a_9, \ldots, 2a_{15}> \quad (8c)$$

$$-a-b = -<2a_0, 2a_1, \ldots, 2a_7, 0, 0, \ldots, 0> \quad (8d)$$

Equations (8a-8d) thus show that half the samples of the 256-chip long synchronization channel (broadcasting the complete k-th synchronization code ($SC_k$) described above) do not convey any bits (i.e., they equal "0") concerning the secondary synchronization code (SSC) since the primary and secondary synchronization channels cancel each other due to their equal broadcast power. It will, of course, be understood that they still carry information since the absence of $a_k$ or $-a_k$ in the sequences of Equations (8a-8d) makes up a piece of information. The present invention takes advantage of the foregoing characteristics of Equations (8a-8d), and the complete synchronization channel (SCH), to improve step 2 processing by utilizing the zero instants to avoid correlating with noise only. This is accomplished by correlating the input signal s(t) with the complete k-th synchronization code ($SC_k$) (which additionally include the primary synchronization code), instead of just the k-th secondary synchronization code ($SSC_k$). Given that for step 2 processing the timing of the primary synchronization code (PSC) is assumed to be known, correlating the input signal s(t) by either the k-th secondary synchronization code ($SSC_k$) or complete k-th synchronization code ($SC_k$) (PSC+$SSC_k$), will generate the same amount of information. However, if the complete k-th synchronization code ($SC_k$) (PSC+$SSC_k$) is used for the correlation, an improvement in signal-to-noise ratio over conventional $SSC_k$ processing alone is experienced.

The complete k-th synchronization code ($SC_k$) (PSC+$SSC_k$) correlation may accordingly be estimated as:

$$\overline{SC}_k = \sum_{n=0}^{15} \left\{ A_n \left( \sum_{p=0}^{15} a_p s(t_0 + 16n + p) \right) + h'_{k,n} B_n \left( \sum_{p=0}^{15} b_p s(t_0 + 16n + p) \right) \right\} \quad (9)$$

to produce complete synchronization channel correlation. Now, recalling the discussion above concerning the SSC and the sequence z, Equation (9) may be rewritten as follows:

$$\overline{SC}_k = \sum_{p=0}^{7} a_p \left( \sum_{n=0}^{15} (A_n + h'_{k,n} B_n) s(t_0 + 16n + p) \right) + \sum_{p=8}^{15} a_p \left( \sum_{n=0}^{15} (A_n - h'_{k,n} B_n) s(t_0 + 16n + p) \right) \quad (10)$$

In Equation (10), it will be recognized that one-half the terms are zero since for any given value of n:

either $A_n + h'_{k,n} B_n = \pm 2$ and $A_n - h'_{k,n} B_n = 0$ \quad (11a)

or $A_n + h'_{k,n} B_n = 0$ and $A_n - h'_{k,n} B_n = \pm 2$ \quad (11b)

In comparison to the prior art Equations (5) and (7) discussed elsewhere herein, the correlation performed by Equation (10) for one particular k requires the use of only 128 s(t) samples as opposed to the 256 samples required when correlating the SSC alone. In this regard, it will be recognized that these 128 samples span over 256 chips, in general, and that all 256 chips are needed to perform the correlations for all values of k. It is further recognized that the correlation operation performed in accordance with the present invention provides improved performance with lower Eb/No levels. The sixteen complete synchronization channel correlations of the synchronization code ($SC_k$) that are calculated in accordance with the process of the present invention may be used (without modification or adjustment) in place of the sixteen secondary synchronization code energy values (one per k) of the prior art process for step 2 frame synchronization and code-group identification in a manner well known to those skilled in the art.

To implement the processing operation of the present invention, it is noted that two different inner sums (low and high) may be defined for each set of sixteen consecutive chips as follows:

$$\begin{cases} IS_{hi,n} = \sum_{p=0}^{7} a_p s(t_0 + 16n + p) \\ IS_{lo,n} = \sum_{p=8}^{15} a_p s(t_0 + 16n + p) \end{cases} \quad 0 \le n \le 15 \quad (12)$$

It is noted that the total inner sum ($IS_n$) is equal to:

$$IS_n = IS_{hi,n} - IS_{lo,n} \quad (13)$$

in the same manner as in Equation (6) of the prior art step implementation. Thus, any device designed to compute the high and low inner sums in accordance with Equations (12-13) may also be used to implement the prior art Equation (6) inner sum calculation (thus providing backward compatibility).

Depending on the particular secondary synchronization code $SSC_k$ sequence under investigation, and considering the actual sixteen chip group within the 256-chip long $SSC_k$, only either $IS_{hi,n}$ or $IS_{lo,n}$ is considered at one time since the other inner sum will produce only noise that is of no importance to the step 2 process. More specifically, it is recognized that some $SSC_k$ calculations make use of $IS_{hi,n}$ for a given index of n, while others make use of $IS_{lo,n}$.

The low and high inner sums are used for the synchronization code ($SC_k$) calculation of Equation (10). If you now define:

$$\varepsilon^1_{k,n} = A_n + h'_{k,n} B_n, \text{ and} \quad (14a)$$

$$\varepsilon^2_{k,n} = A_n - h'_{k,n} B_n \quad (14b)$$

then, the prior synchronization code ($SC_k$) calculation of Equation (10) may be rewritten as follows:

$$\overline{SC}_k = \sum_{n=0}^{15} \varepsilon^1_{k,n} \left( \sum_{p=0}^{7} a_p s(t_0 + 16n + p) \right) + \quad (15)$$

-continued $$\sum_{n=0}^{15} \varepsilon_{k,n}^2 \left( \sum_{p=8}^{15} a_p s(t_0 + 16n + p) \right)$$

and simplified using Equation (12) as:

$$\overline{SC_k} = \sum_{n=0}^{15} \varepsilon_{k,n}^1 IS_{hi,n} + \sum_{n=0}^{15} \varepsilon_{k,n}^2 IS_{lo,n} \quad (16)$$

It will be noted and remembered, from the discussion above, that for any given value of n, either Equation (14a) or Equation (14b) will be zero. Thus, the execution of Equation (16) will require a total of 128 values of the input signal s(t), instead of the 256 values required for the execution of Equation (7) in accordance with the prior art to produce the sixteen complete synchronization channel correlations.

Figure 1:
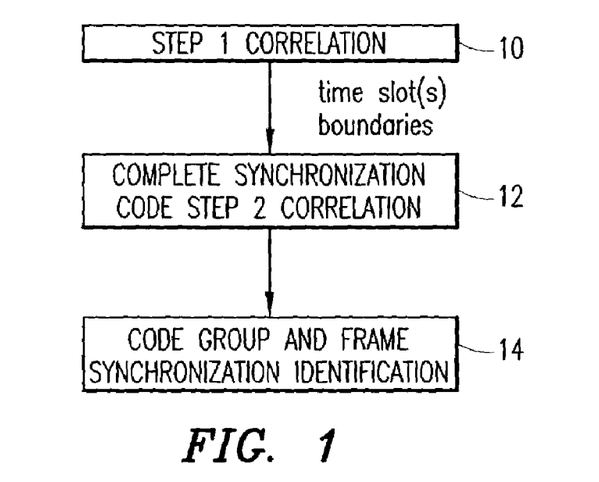
FIG. 1 is a flow diagram illustrating a process for code group acquisition for a CDMA signal in accordance with the present invention.

Reference is now made to FIG. 1 wherein there is shown a flow diagram illustrating a process for code group acquisition for an input signal in accordance with the present invention. It will be recognized that the steps 10-14 illustrated in FIG. 1 may be performed in the sequence shown. However, it is also possible, and perhaps preferred, for the process of step 10 to be performed first, with the processes of steps 12 and 14 performed in parallel. It is also possible for the process of step 10 to be performed and have the step 12 process begun while step 10 is completed. Turning now specifically to FIG. 1, in step 10, the input signal undergoes a primary synchronization channel (P-SCH) correlation for step 1 time slot acquisition. In this process, the input signal having unknown time slot locations is correlated against the primary synchronization code to generate a correlation energy value at each one of a plurality of time positions. This correlation is repeated over a plurality of time positions, each time generating correlation energy values. The values are accumulated over time. A certain one of the time positions having a maximum accumulated correlation energy value is then selected as a starting point of the known time slot location.

In step 12, the input signal (having know time slot locations and an unknown frame alignment) undergoes a complete synchronization channel (SCH) correlation for step 2 code group and frame alignment acquisition (that is distinct as discussed herein from the step 1 process performed for PSC correlation 10). This operation in step 12 is to be contrasted with the prior art process of performing only a secondary synchronization channel (SSC) correlation (following completion of step 1 correlation in step 12). This complete synchronization channel (SCH) correlation demodulates that received input signal using a code comprising a combination of a primary synchronization code (PSC) and a k-th secondary synchronization code ($SSC_k$). Notably, the step 12 process for complete synchronization code correlation utilizes the time slot(s) and boundary data produced from the step 1 operation.

The primary synchronization code (PSC) is a pattern array as generally described above. In a preferred embodiment of the present invention relating to a UMTS-FDD implementation, the pattern array for the PSC is 256-chips long and equals Aa. The k-th secondary synchronization code ($SSC_k$) is a pattern array as generally described above. In a preferred embodiment of the present invention relating to a UMTS-FDD implementation, the pattern array for the k-th $SSC_k$ is 256-chips long and equals h'$_k$Bb. More specifically, for the correlation processing performed in the complete synchronization channel (SCH), the 256-chip long pattern array for the SSC is multiplied by a row k of the Hadamard matrix and thus equals h'$_k$Bb wherein h'$_k$ is a sequence made from elements taken from the Hadamard matrix, and more specifically elements taken from a common, single, row of that matrix.

The complete synchronization channel correlation of the input signal s(t) is made against all k sequences of the complete synchronization code ($_{Sck}$=PSC+$SSC_k$) at each time slot, thus using both the PSC pattern array and the k-th SSC pattern array, to acquire code group related information by performing a reverse Hadamard transformation. Notably, and importantly, this correlation against the complete synchronization code (SC) is made in step 12 instead of performing a correlation against the k secondary synchronization codes alone, as taught by the prior art step 2 process. Given the complex nature of the input signal s(t), the correlation process is performed against both in-phase (I) and quadrature phase (Q) components.

The code group related information acquired from the processing performed in step 12 comprises a plurality of correlation values. The magnitude of these correlation values is considered in a maximum energy finding operation performed in step 14 to identify code group and frame synchronization. Importantly, the use of the primary synchronization code (PSC) in conjunction with the k secondary synchronization codes ($SSC_k$) for the complete synchronization channel (SCH) correlation of step 12 results in the generation of the same amount of information but with a significantly higher signal-to-noise ratio.

Since the cyclic shifts in the secondary synchronization code sequences are unique, once a match between one sequence and the input signal is found (using the maximum energy finding operation discussed above), the particular code group as well as the frame synchronization may be determined in step 14. This then completes the frame synchronization and code-group identification (step 2) process.

The step 12 process generally described in FIG. 1, in the specific context of the Equations (12 to 16), may be more specifically described in algorithmic form for implementation. Set forth below is a pseudo-C implementation of the algorithm for FIG. 1, step 12. It will be noted, for ease of understanding, that the same indices are used for the algorithm below as were used in the discussion above. Prior to discussing the specifics of the algorithm, however, some definitions are required:

I [] and Q [] denote the sampled in-phase and quadrature phase components of the input signal s(t) at certain time index (although it will be understood that the invention may be practiced with only one phase);

$t_0$ denotes the time index;

start_of_slot denotes the actual value of $t_0$ where the slot begins (this information is known from step 1 processing);

slot_length denotes the length of the slot in samples (for example, if the sample rate is the chip rate, then the slot length is 2560 for UMTS-FDD);

$IS_{I,hi}$[] and $IS_{I,lo}$[] each denote an array, each array containing sixteen values, for the in-phase high and low inner sums;

$IS_{Q,hi}$[] and $IS_{Q,lo}$[] each denote an array, each array containing sixteen values, for the quadrature phase high and low inner sums;

such that:

$$IS_{hi,n} = IS_{I,hi}[n] + jIS_{Q,hi}[n]$$

$$IS_{lo,n} = IS_{I,lo}[n] + jIS_{Q,lo}[n]$$

from Equation (12), where "j" is not an index but rather denotes the imaginary portion of the number, and a[] denotes the sixteen-chip long a sequence of the primary synchronization code (PSC) where:
a=<1,1,1,1,1,1,−1,−1,1,−1,1,−1,1,−1,−1,1> for UMTS-FDD.

Now, the inner sum arrays $IS_{I,hi}[]$, $IS_{I,lo}[]$, $IS_{Q,hi}[]$ and $IS_{Q,lo}[]$ are initialized to zero as follows:

for (p=0; p<16; p++)

$$IS_{I,hi}[] = IS_{I,lo}[] = IS_{Q,hi}[] = IS_{Q,lo}[] = 0;$$

Next, preprocessing to fill the inner sum arrays $IS_{I,hi}[]$, $IS_{I,lo}[]$, $IS_{Q,hi}[]$ and $IS_{Q,lo}[]$ in accordance with Equation (12) is performed as follows:

```
if ((t0 % slot_length) == (start of_slot) then
{
    for( n=0; n<16; n++)
    {
        for( p=0; p<8; p ++)
        {
            IS_{I,hi} [n] += I[t0+16*n+p]*a[p];
            IS_{Q,hi} [n] += Q[t0+16*n+p]*a[p];
        }
        for( p=8; p<16; p++)
        {
            IS_{I,lo} [n] += I[t0+16*n+p]*a[p];
            IS_{Q,lo} [n] += Q[t0+16*n+p]*a[p];
        }
    }
}
```

The foregoing process first tests whether the current time index modulo the length of the slot equals the actual start time for the slot. The effect of this test is to divide the first 256 chips of each time slot into N=16 groups of sixteen consecutive values where the groups are tracked by the index n and the values in each group are tracked by the index p as set forth in the $(t_0+16*n+p)$ index for the I and Q samples of the input signal s(t). It is these groups of consecutive values against which the correlation operation is performed. As a part of the correlation, the inner sums must first be determined. The remainder of the process above makes those inner sum determinations. More specifically, and with reference to Equation (12) above, high and low inner sums (tracked by the index p), for both in-phase and quadrature phase components, are calculated. Notably, these inner sums are calculated using the a sequence component of the primary synchronization code as indicated by the a [p] portion of the calculation. The inner sum for a given index value of n is equal to an accumulation, over the nested incrementing index p, of the product (S*a) of the complex input signal sample (s(t)=I(t)+jQ(t)) at an index defined by $(t_0+16n+p)$ and the corresponding p-th value of the a portion of the PSC.

Next, a reverse Hadamard transform is performed. Before discussing the specifics of the reverse transform, however, some additional definitions are required:

$SC_I[]$ and $SC_Q[]$ each denote an array, each array containing sixteen values, for the in-phase and quadrature phase components of the complete synchronization code (SC) for each value of k (0-15), the arrays defined by the Equations (9) and (10), where:

$$\overline{SC}_k = SC_I[k] + jSC_Q[k];$$

$h'_k$ denotes, with the convention of Equation (4), a certain row of the Hadamard matrix;

A[] denotes a 16-element long pattern representing the pattern A(0),A(1), . . . ,A(15) of the definition of the PSC as set forth herein; and B[] denotes a 16-element long pattern representing the pattern B(0),B(1), . . . ,B(15) of the definition of z as set forth herein.

Before starting the reverse Hadamard transformation, the synchronization code arrays $SC_I[]$ and $SC_Q[]$ are initialized to zero as follows:

for (k=0; k<16; k++)

$$SC_I[k] = SC_Q[k] = 0$$

Next, the reverse Hadamard transformation is performed as follows:

```
for( k = 0; k < 16; k++ )
{
    for( n = 0; n < 16; n++ )
    {
        if((h'_k[n]* B[n] == 1) && (A[n] == 1))
        {
            SC_I[k] += IS_{I,hi}[n];
            SC_Q[k] += IS_{Q,hi}[n];
        }
        if((h'_k[n]* B[n] == −1) && (A[n] == 1))
        {
            SC_I[k] += IS_{I,lo}[n];
            SC_Q[k] += IS_{Q,lo}[n];
        }
        if((h'_k[n]* B[n] == 1) && (A[n] == −1))
        {
            SC_I[k] −= IS_{I,lo}[n];
            SC_Q[k] −= IS_{Q,lo}[n];
        }
        if((h'_k[n]* B[n] == 1) && (A[n] == −1))
        {
            SC_I[k] −= IS_{I,hi}[n];
            SC_Q[k] −= IS_{Q,hi}[n];
        }
    }
}
```

The loop defined by the incrementing index k cycles the reverse Hadamard transformation through each possible Hadamard sequence. The nested loop defined by the incrementing index n cycles the process through each group of sixteen consecutive values (resulting from the division of the first 256 chips of each slot into groups). This, in essence computes Equation (16) using the properties of Equations (11a-11b) (or the set of properties of Equations (8a-8d), which are equivalent). It will be noted, however, that for ease of this code implementation, the coefficient "2" in Equations (11a-11b) is dropped and replaced by "1".

The first if statement then tests whether both 1) the product of the n-th value in row k of the Hadamard matrix and the n-th value of the B pattern, and 2) the n-th value of the A pattern, are equal to one. This test implements the particular case recited in Equation (8a) above (or the Equation (11a) subcase=2). If so, then the k-th value of complete synchronization code SC correlation includes a positive accumulation of the n indexed, precomputed, high inner sum value.

The next if statement then tests whether 1) the product of the n-th value in row k of the Hadamard matrix and the n-th value of the B pattern is equal to minus one, and 2) the n-th value of the A pattern is equal to one. This test implements the particular case recited in Equation (8b) above (or the Equation (11b) subcase=2). If so, then the k-th value of complete synchronization code SC correlation includes a positive accumulation of the n indexed, precomputed, low inner sum value.

The next if statement then tests whether 1) the product of the n-th value in row k of the Hadamard matrix and the n-th value of the B pattern is equal to one, and 2) the n-th value of the A pattern is equal to minus one. This test implements the particular case recited in Equation (8c) above (or the Equation (11b) subcase=−2). If so, then the k-th value of complete synchronization code SC correlation includes a negative accumulation of the n indexed, precomputed, low inner sum value.

Finally, the last if statement tests whether both 1) the product of the n-th value in row k of the Hadamard matrix and the n-th value of the B pattern, and 2) the n-th value of the A pattern, are equal to minus one. This test implements the particular case recited in Equation (8d) above (or the Equation (11a) subcase=−2). If so, then the k-th value of complete synchronization code SC correlation includes a negative accumulation of the n indexed, precomputed, high inner sum value.

What will be noted from a review of the algorithm for the reverse Hadamard transformation is that only one of the if sections is satisfied and implemented for indexed value of n. This not only defines which of the high or low inner sum values is used, but also defines whether a positive or negative accumulation of the inner sum value toward the complete synchronization code (SC) correlation value is performed. It will also be noted that the algorithm processes the input signal s(t), through the precalculated inner sum values, for correlation against the combination of both the primary synchronization code (PSC) and the k-th secondary synchronization code ($SSC_k$), instead of solely against the $SSC_k$ as set forth by the prior art step 2 process.

Figure 2:
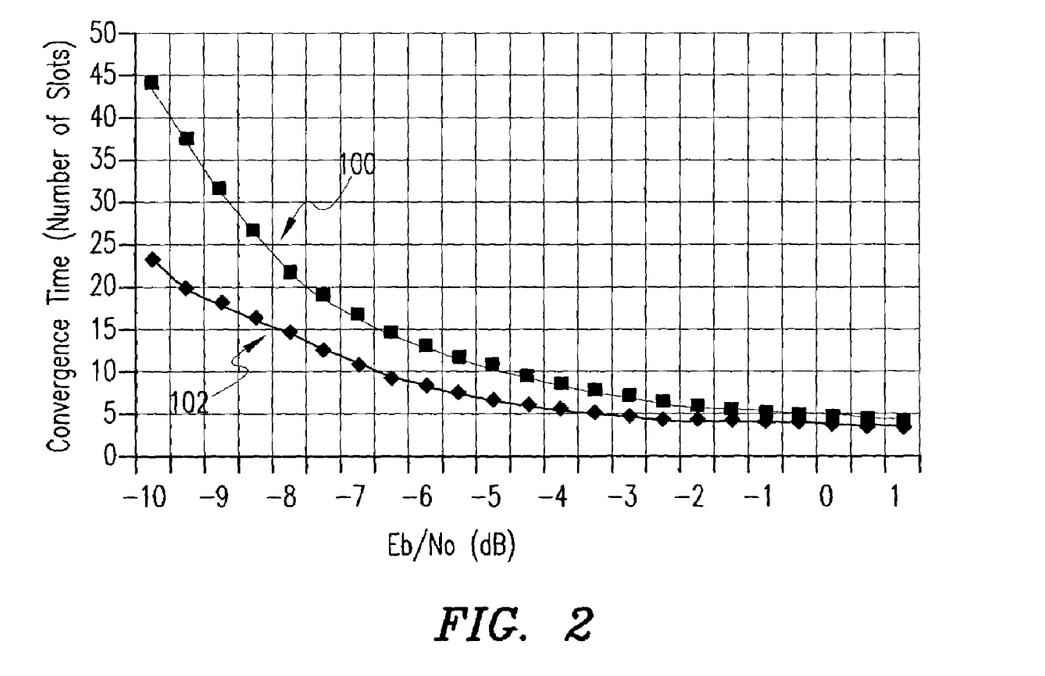
FIG. 2 is a graph illustrating a comparison of the convergence rates for the process of the present invention against the prior art.

Reference is now made to FIG. 2 wherein there is shown a graph illustrating a comparison of the convergence rates for the process of the present invention against the prior art. The graph represents the average step 2 process convergence rate for Energy per bit to Noise density level (Eb/No) measured in dB (with a range of −10 dB to +1 dB) in comparison to the number of slots. It will be recognized by those skilled in the art that a direct relationship exists between the Eb/No and the signal-to-noise ratio. In the simulation that was run to produce the graph, eighty iteration runs were made per signal-to-noise ratio point. The simulations were conducted on an AWGN channel model, with an in-house base station model as the transmitter. Each iteration was run with a different seed of the AWGN noise generator.

After each slot, an "energy" is computed for each of the sixty-four possible scrambling code groups. This energy is the sum of the secondary synchronization channel correlation energies E ($SSC_k$)'s in the conventional prior art method or the sum of the complete synchronization channel correlation energies $E(SC_k)$'s in the algorithm set forth above in accordance with the complete synchronization channel correlation solution of the present invention. These energies are then sorted in decreasing order, with the selected scrambling code group corresponding to the one of the energies having the highest value. Notably, for each of the 64 code groups, the 15 possible offsets of the boundary are studied. For example, and with reference to FIG. 2, a particular iteration in this case is considered to have reached convergence, a posteriori, once the selected scrambling code group is correct and remains selected until the end of the simulation (after a certain number of slots, for example, thirty).

With specific reference now to the graph of FIG. 2, the curve 100 illustrates the convergence rate for the prior art step 2 process which utilizes just the secondary synchronization code by processing the received signal in a secondary synchronization channel. The curve 102, on the other hand, illustrates the convergence rate for the implementation of the present invention where the received signal is processed through a complete synchronization channel correlator using both the primary synchronization code and the secondary synchronization code. A comparison of curve 102 to curve 100 reveals a significant improvement in performance that is experienced with the solution of the present invention. More specifically, it is noted that the convergence rate is increased for the present invention by a factor ranging from 1.25 to 1.95 for Eb/No ranging from −1 dB to −10 dB. This is estimated to correspond to a time savings in step 2 process completion of between 20% and 49% and with improved Eb/No levels in comparison to the prior art solution. Notably, the increase is of greater importance at low Eb/No, such as when the initial acquisition happens to be most difficult.

Figure 3A:
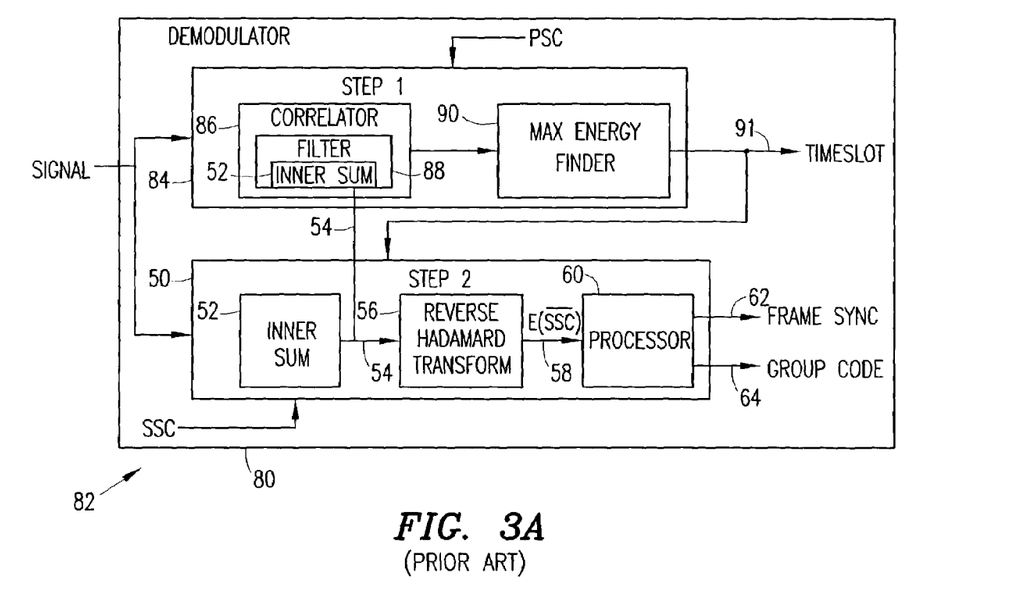
FIGS. 3A and 3B are block diagrams for step 2 implementation systems.

Reference is now made to FIG. 3A which illustrates a block diagram for a secondary synchronization channel correlator implementation 50 suitable for performing the step 2 process in accordance with the prior art method. The implementation 50 includes a dedicated hardware device 52 (although a software implementation is also possible) that is configured to make the inner sum calculations defined by Equation (6). It will be understood that the processing device 52 may be separate from, or alternatively provided by, the step 1 filtering 88 operation performed by the PSC correlator 86 (both implementations are illustrated for convenience). The determined inner sums (IS) are output 54 to a software-based processor 56 (although a hardware implementation is also possible) that is configured to implement the reverse Hadamard transform calculations defined by Equation (7) and demodulate the signal in view of the secondary synchronization code alone. The determined secondary synchronization code energy values are output 58 for further handling and processing (using processor 60—which may comprise the same processor 56) in a manner well known to those skilled in the art to produce frame synchronization data 62 and code-group identification data 64. In one possible implementation, this processing involves comparing the generated correlation energies, identifying a maximum one of those energies, and identifying a secondary synchronization code having that maximum energy as the code present within a given time slot of the received signal. From knowledge of the code, the code group and frame synchronization information are revealed. Put another way, this process involves first processing 16 possible $SSC_k$ correlations each slot. Next, the energies are passed (see, reference 58) for further processing. These energies are sorted, with the maximum one corresponding to the particular $SSC_k$ that was transmitted in a given time slot. From this information, implicitly, over several time slots, the code group can be determined.

In another, more optimal procedure, the processing for producing frame synchronization data and code-group identification data occurs as follows in accordance with a recognized comprehensive detection method. A code group is "coded" by a 15-long series of $SSC_k$. Let us define these series as:

Group 0: SSC[K(0,0)],SSC[K(0,1)], . . . , SSC[K(0,14)]
Group 1: SSC[K(1,0)],SSC[K(1,1)], . . . , SSC[K(1,14)] . . .

Group 63: SSC[K(63,0)],SSC[K(63,1)], ..., SSC[K(63, 14)];

wherein K is an index mapping such that for any pair (i,j) with $0 \leq i < 64$ and $0 \leq j < 15$ there is an index k, $0 \leq k < 16$ such that:

k=K(i,j) and SSC[K(i,j)]=$SSC_k$;
i is the group index; and
j is the slot index.

Assume now that the step 2 procedure has been running for 15 slots. For each slot, the processor computes 16 $SSC_k$ estimates (and more specifically in the context of the present invention, $SC_k$ estimates, noting again that for purposes of the following operation, $SSC_k$ estimates and $SC_k$ estimates are interchangeable). At this point, an array of 15×16 $SSC_k$ estimates (or $SC_k$ estimates) denoted SSC' (j',k) has been built:

| Slot #: | 0, | 1, | ... | 14 |
|---|---|---|---|---|
| | SSC' (0, 0), | SSC' (1, 0), | ..., | SSC' (14, 0) |
| | SSC' (0, 0), | SSC' (1, 1), | ..., | SSC' (14, 0) |
| | ... | | | |
| | SSC' (0, 15), | SSC' (1, 15), | ..., | SSC' (14, 15). |

In SSC' (j',k), j' is the slot index and k denoted a particular line of the Hadamard transform as defined by Equations (1) and (4). At this point, the processor calculates 64 cumulated energies. These energies are used as likelihoods relating to whether each code group candidate matches the actual transmitted group, assuming that the first slot when the step 2 procedure was activated was aligned with the first slot of a frame. In other words Slot j'=0 matches j=0 in the definition of pairs (i,j) above. The procedure then repeats calculating 64 cumulated energies, assuming Slot j'=1 matches j=0, j'=14 matches j=13 and cycling over to j'=0 matches j=14. The process is iterated for each of the 15 possible slot alignments. In the end, there exist a total of 15×64 cumulated energies of $SSC_k$ (or $SC_k$) indexed by j' for the 15 possible slot offsets and i for the 64 possible code groups. The maximum one of these 15×64=960 values is then selected. Its corresponding pair (j',i) gives the code group (i) and the slot offset (j') between the local timing and the base station timing. Of course, if there is no obvious maximum, the procedure can be deemed to have failed.

Now assume that the procedure has run for less than 15 slots. The same algorithm can already be applied, by setting the $SSC_k$ energies (or $SC_k$) to zero for those slots that have not yet been received. On the contrary, assume that the procedure has run for more than 15 slots, the algorithm can still be used by continuing to accumulate new incoming energies. In the implementation of the present invention (comparison results shown on FIG. 2), the last two remarks are taken advantage of to provide for improved performance.

With respect to a simplified detection method, the $SSC_k$ (or $SC_k$) is selected which corresponds to the highest energy value after each slot. After p slots, a series of likely $SSC_k$ (or $SC_k$) is built:

SSC(0), SSC(1), ..., SSC(p)

This series is matched against all 64 possible series, each of them in their 15 shifted positions. At this point no energy value is retained. The best match (if unique) is then selected.

Figure 3B:
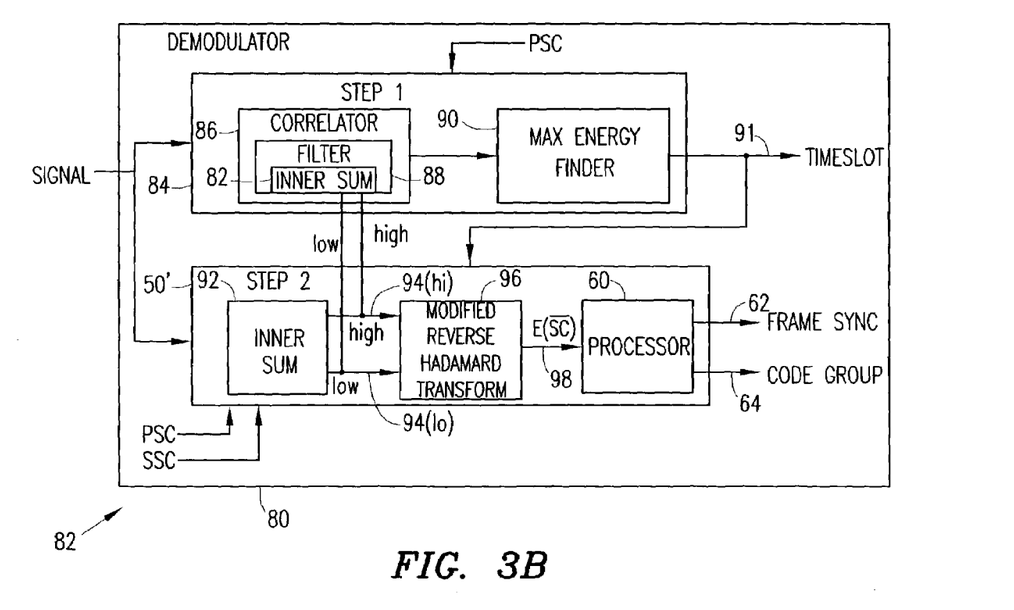

Turning now to FIG. 3B, a block diagram of a complete synchronization channel correlator implementation 50' is shown that is suitable for performing the step 2 process in accordance with the present invention. The implementation 50' includes a dedicated hardware device 92 (could also be implemented as software) that is configured to make the high and low inner sum calculations defined by Equation (12). It will be understood that the processing device 92 may be separate from, or alternatively provided by, the step 1 filtering 88 operation performed by the correlator 86 (both implementations are illustrated for convenience). The determined high and low inner sums ($IS_{hi}$ and $IS_{lo}$) are output 94(hi) and 94(lo), respectively, to a software-based processor 96 (could also be implemented in hardware) that is configured to implement the modified reverse Hadamard transform calculations defined by Equation (16) and demodulate the signal in view of the complete synchronization code (primary synchronization code plus secondary synchronization code). The determined complete synchronization code energy values are output 98 for further handling and processing (using processor 60—which may be the same as processor 96) in a manner well known to those skilled in the art (as discussed above) to produce frame synchronization data 62 and code-group identification data 64.

Each of the channel implementations 50/50' may be included in a demodulator 80 for a UMTS-FDD (or WCDMA) receiver 82 (shown in both FIGS. 3A and 3B). The demodulator 80 further includes a primary synchronization channel implementation 84 that is suitable for performing the step 1 process in accordance with the prior art (see, also, FIG. 1, step 10). The implementation 84 includes a correlator 86 that operates to correlate the received signal with the primary synchronization channel. This correlator 86 is typically implemented as a matched filter 88 whose output is provided to a maximum energy finder 90. The matched filter 88 compares the received signal to the primary synchronization code and produces correlation outputs. As noted above, the correlator 86, in one implementation, produces the inner sums IS or the high and low inner sums $IS_{hi}$ and $IS_{lo}$ for output to the step 2 calculation as described above (using the channel correlator implementations 50 and 50', respectively. The finder 90 processes the energy output, identifies maximum energies, and identifies time slot(s) of the received signal corresponding to the maximum correlation as containing the primary synchronization code (as well as boundary information). The identified time slot(s) and boundary information is then output 91 and used in the implementation 50/50' for step 2 processing (as discussed above) as the given time slot against which the secondary synchronization correlation is performed. It will also be noted that the step 1 process may produce hypothetical slot boundaries in an early fashion for use by the step 2 process in order to speed code group acquisition.

The receiver, and more specifically, the demodulator for the receiver, may be implemented in hardware, software and/or a combination of both. More specifically, the receiver and/or demodulator may be implemented using integrated circuit techniques in a single integrated circuit or as a chip set.

Although the preferred embodiment assumes an equal transmission power of the PSC and SSC, it will be recognized that the technique of the present invention is equally useful in situations where the power levels are not equal. In such a situation, the algorithm discussed and implemented above can be adjusted through the use of appropriate weights on each channel to account for the difference in power levels. For example, the processing of the channels by the algorithm may be weighted in proportion to the respective power level of the PSC and SSC.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for code group acquisition by a receiver, comprising the steps of:
   correlating an input signal at a known time slot location against a complete synchronization code to acquire code group and frame synchronization information; and
   outputting the code group and frame synchronization information;
   where:
   the complete synchronization code used in the step of correlating is a combination of a primary synchronization code (PSC) and secondary synchronization code (SSC).

2. The method as in claim 1 wherein the secondary synchronization code (SSC) comprises a plurality of secondary synchronization code sequences defining a code group, and the step of correlating comprises the step of:
   correlating the input signal against the complete synchronization code comprising the primary synchronization code (PSC) plus one of the plurality of secondary synchronization code sequences.

3. The method as in claim 2 wherein a generated correlation energy from the step of correlating possesses a better signal-to-noise ratio than would be obtained by a correlation of the input signal against just the selected one of the plurality of secondary synchronization code sequences.

4. The method as in claim 2 wherein the step of correlating comprises the step of iteratively repeating the step of correlating each time using a different one of the plurality of secondary synchronization code sequences with the primary synchronization code as the complete synchronization code.

5. The method as in claim 4 further including the step of:
   identifying code group and frame synchronization for the input signal based on the results of the iteratively repeated correlating step.

6. The method as in claim 1 wherein the known time slot is obtained by a prior step of:
   correlating the input signal against just the primary synchronization code (PSC) alone to obtain slot timing information.

7. A complete synchronization channel correlator for demodulating an input signal to recover code group and frame alignment data, comprising:
   a correlator that receives the input signal at a known time slot location for correlation against a complete synchronization code to acquire code group and frame synchronization data, and outputs the code group and frame synchronization data;
   where:
   the complete synchronization code used by the correlator is a combination of a primary synchronization code (PSC) and secondary synchronization code (SSC).

8. The channel correlator as in claim 7 wherein the secondary synchronization code (SSC) comprises a plurality of secondary synchronization code sequences defining a code group, and the correlator further operates to correlate the input signal against the complete synchronization code comprising the primary synchronization code (PSC) plus one of the plurality of secondary synchronization code sequences.

9. The channel correlator as in claim 8 wherein a generated correlation energy from the correlation possesses a better signal-to-noise ratio than would be obtained by a correlation of the input signal against just the selected one of the plurality of secondary synchronization code sequences alone.

10. The channel correlator as in claim 8 wherein the correlator operates iteratively to repeat the correlation, each time using a different one of the plurality of secondary synchronization code sequences with the primary synchronization code as the complete synchronization code.

11. The channel correlator as in claim 10 wherein the correlator further operates to identify code group and frame synchronization for the input signal based on the results of the iteratively repeated correlation.

12. The channel correlator as in claim 7 wherein the channel is present within a receiver demodulator, the receiver demodulator further including a primary synchronization channel, the primary synchronization channel including:
   a second correlator that receives the input signal for correlation against just the primary synchronization code (PSC) alone to obtain slot timing information that identifies the known time slot location.

13. The channel correlator as in claim 12 wherein the receiver demodulator is implemented within at least one integrated circuit chip.

14. A receiver synchronization device, comprising:
   a primary synchronization channel correlator that utilizes a primary synchronization code alone in processing a received input signal to extract information identifying time slot location; and
   a complete synchronization channel correlator that utilizes a combination of the primary synchronization code and secondary synchronization code in correlation against the received input signal at the time slot location identified by the primary synchronization channel to produce code group and frame alignment information.

15. The device as in claim 14 wherein the secondary synchronization code comprises a plurality of secondary code sequences, the complete synchronization channel correlator operating to identify which one of the secondary code sequences is present in the received signal at the identified time slot location.

16. The device as in claim 14 wherein the primary synchronization channel correlator includes:
   a first correlator that receives the input signal for correlation against the primary synchronization code alone to obtain slot timing information that identifies the time slot location.

17. The device as in claim 16 wherein the complete synchronization channel correlator comprises:
   a second correlator that receives the received signal at the time slot location for correlation against the combined primary synchronization code and secondary synchronization codes to produce the code group and frame synchronization information.

18. The device as in claim 17 wherein the second correlator comprises:
   an inner sum processor operable on the received signal to produce a high inner sum and a low inner sum; and a modified reverse Hadamard transform processor operable on the high and low inner sums to produce correlation energy values for each one of a plurality of complete synchronization codes formed from the combination of the primary synchronization code and one of a plurality of secondary synchronization codes.

19. The device as in claim 18 wherein the generated correlation energy values possesses a better signal-to-noise ratio than would be obtained by correlating the received signal against the one of the plurality of secondary synchronization codes alone.

20. The device as in claim 14 wherein the demodulator is implemented as at least one integrated circuit chip.

21. A synchronization processing method, comprising the steps of:
  correlating a received signal having known time slot locations and an unknown frame alignment against each one of k full synchronization codes, each full synchronization code comprising the combination of a time slot synchronization code plus one of k plurality of framing synchronization codes, to generate a corresponding k correlation energy values per time slot;
  repeating the step of correlating over several time slots;
  processing the generated correlation energy values for the several time slots to determine which one of a plurality of possible sequences of framing synchronization codes is present in the received signal, the determined one of the sequences of framing synchronization codes identifying the frame alignment of the received signal; and
  outputting frame synchronization data representative of the frame alignment.

22. The method as in claim 21 wherein the several time slots are consecutive time slots.

23. The method as in claim 21 further including the precursor steps of:
  correlating the received signal having unknown time slot locations against the time slot synchronization code to generate a correlation energy value at each one of a plurality of time positions;
  repeating the step of correlating over a plurality of time positions;
  accumulating the generated correlation energy values; and
  selecting a certain one of the time positions that has a maximum accumulated correlation energy value as a starting point of the known time slot location.

24. The method as in claim 21 wherein the step of processing comprises the steps of:
  comparing each one of the plurality of possible sequences of framing synchronization codes with the generated correlation energy values for the several time slots; and
  selecting one of the sequences of secondary synchronization codes as present if the comparison indicates a match between that one of the plurality of possible sequences of framing synchronization codes and the generated correlation energy values.

25. The method as in claim 24 wherein the step of comparing includes the step of:
  cycling position of the several time slots and associated correlation energy values, and comparing each one of the plurality of possible sequences of framing synchronization codes with the generated correlation energy values for each cycled position of the several time slots.

26. The method as in claim 25 wherein the cycled position of the several time slots which produces a best match between that selected one of the plurality of possible sequences of framing synchronization codes and the generated correlation energy values identifies the frame alignment of the received signal.

27. The method as in claim 21 wherein the step of processing comprises the steps of:
  identifying from the correlation energy values a best correlated one of the framing synchronization codes for each time slot;
  repeating the step of identifying over several time slots to obtain a sequence of best correlated framing synchronization codes;
  comparing each one of the plurality of possible sequences of framing synchronization codes with the obtained sequence of best correlated framing synchronization codes; and
  selecting one of the sequences of framing synchronization codes as present if the comparison indicates a match between that one of the plurality of possible sequences of framing synchronization codes and the obtained sequence of best correlated framing synchronization codes.

28. The method as in claim 27 wherein the step of comparing includes the step of:
  cycling position of the obtained sequence of best correlated framing synchronization codes, and comparing each one of the plurality of possible sequences of framing synchronization codes with the obtained sequence of best correlated framing synchronization codes for each cycled position.

29. The method as in claim 28 wherein the cycled position of the obtained sequence of best correlated framing synchronization codes which produces a best match between that selected one of the plurality of possible sequences of framing synchronization codes and the obtained sequence of best correlated framing synchronization codes identifies the frame alignment of the received signal.

30. The method as in claim 21 wherein the time slot synchronization code comprises a UMTS-FDD primary synchronization code and the framing synchronization code comprises a UMTS-FDD secondary synchronization code.

* * * * *